United States Patent
Curry

(10) Patent No.: US 6,346,993 B1
(45) Date of Patent: Feb. 12, 2002

(54) TONE-VARIATION-RESISTANT PHASE-SHIFTABLE HALFTONE SCREEN SYSTEM AND METHOD OF USING

(75) Inventor: Douglas N. Curry, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/244,767

(22) Filed: Feb. 5, 1999

(51) Int. Cl.[7] .................................................. H04N 1/46
(52) U.S. Cl. ........................ 358/1.9; 358/534; 358/536; 358/456; 358/298; 358/454
(58) Field of Search ................................ 358/534, 535, 358/536, 455, 456, 457, 1.9, 298, 454, 515, 518; 382/162, 167

(56) References Cited

U.S. PATENT DOCUMENTS

| | | | |
|---|---|---|---|
| 4,537,470 A | | 8/1985 | Schoppmeyer |
| 4,924,301 A | * | 5/1990 | Surbrook ..................... 358/534 |
| 5,138,339 A | | 8/1992 | Curry et al. |
| 5,155,599 A | * | 10/1992 | Delabastita ................. 358/298 |
| 5,202,772 A | * | 4/1993 | Muir ........................... 358/456 |
| 5,216,443 A | | 6/1993 | Thornton et al. |
| 5,291,296 A | * | 3/1994 | Hains .......................... 358/298 |
| 5,371,612 A | * | 12/1994 | Sakamoto ................... 358/456 |
| 5,381,247 A | * | 1/1995 | Hains .......................... 358/536 |
| 5,404,156 A | * | 4/1995 | Yamada et al. ............. 358/534 |
| 5,410,414 A | | 4/1995 | Curry |
| 5,463,471 A | * | 10/1995 | Chou .......................... 358/298 |
| 5,485,289 A | | 1/1996 | Curry |
| 5,546,197 A | * | 8/1996 | Shibazaki et al. .......... 358/534 |
| 5,594,839 A | * | 1/1997 | Shu ............................. 358/1.9 |
| 5,638,107 A | | 6/1997 | Curry |
| 5,638,110 A | | 6/1997 | Curry |
| 5,696,604 A | | 12/1997 | Curry |
| 5,732,162 A | | 3/1998 | Curry |
| 5,778,091 A | * | 7/1998 | Shibazaki et al. .......... 382/162 |
| 6,172,767 B1 | * | 1/2001 | Takemoto ................... 358/1.9 |

* cited by examiner

*Primary Examiner*—Thomas D. Lee
(74) *Attorney, Agent, or Firm*—Oliff & Berridge, PLC

(57) ABSTRACT

An image generating system that warps both the image data and halftone screens of a halftone screen system to minimize moiré patterns. Merely warping image data to minimize moiré patterns results in offsets within the image data which should have a corresponding adjustment or warp in halftone screens used in the image generating system to render the color image separation layers. Therefore, the image generating system provides moiré pattern minimization by warping screens of the halftone screen system to correspond to the warping of the image data. The image generating system uses line screens for halftoning the chromatic image separation layers of color images and a hexagonal dot screen for halftoning the luminescent image separation layer. The halftone screen system uses the relatively large average screen displacement angles offered by line screening while providing a dynamic tone range performance similar to that of the performance of dot screening.

21 Claims, 5 Drawing Sheets

TONE-VARIATION-RESISTANT PHASE-SHIFTABLE HALFTONE SCREEN SYSTEM AND METHOD OF USING

This application includes an Appendix containing computer code that performs halftoning of images in accordance with this invention.

BACKGROUND OF THE INVENTION

1. Field of Invention

This invention relates to techniques for printing polychromatic continuous tone images. More particularly, this invention is directed to systems and methods for halftoning images for high quality color printing using line screening for color image separation layers and hexagonal dot screening for the black image separation layer.

2. Description of Related Art

Conventional halftoning adds a two-dimensional, spatially periodic, dot screen or line screen structure to the images to be halftoned. Typically, the same screen, or at least a number of essentially identical screens, are used to halftone each of the color image separation layers of a polychromatic, i.e., color, image. However, the halftone screens are oriented at different angles for printing the respective halftone color image separation layers.

Xerographic images are ordinarily printed for reflective mode viewing. Accordingly, xerographic color images typically are composed by printing in superimposed registration a number of subtractive primary color image separation layers usually together with a neutral image separation layer that characterizes the luminescence of the source image. The subtractive primary colors are usually cyan (C), magenta (M), and yellow (Y), while the neutral is usually black ("K"). Additionally, other image separation layers for even further characterizing the source image can be used. Printing in superimposed registration is performed by overlaying the image separation layers produced by the halftone screens at different angles.

Digital halftoning has evolved as a method of rendering the illusion of continuous tone, or "contone", images using devices that are capable of producing only binary picture elements. However, digital halftoning can suffer from misregistration between the various color image separation layers used in color images, for example, cyan, magenta, yellow and black (CMYK). This misregistration can be caused by misalignment among the various halftone screens and also by misalignment between the halftone screens and an image forming apparatus grid structure, i.e., the output grid structure, used to generate electronic image data from an image on an image forming member. It can also include errors in rotation in the screen angle. The misregistration can cause moiré patterns, which are detrimental to the accurate rendering of the color image.

Moirè patterns are "beating", i.e., periodially mismatching, patterns of interference that degrade resulting rendered images. When the overlaid halftone screens provide different component colors, as during rendering of a multicolor image, the moirè pattern can result in a color shift or variation in tone.

Substantial effort and expense have been invested in minimizing the moirè patterns caused by halftoning techniques for producing binary renderings of contone images. Misregistration, improper screen angle and improper screen frequency can increase the halftone screens' susceptibility to moirè patterns. Additionally, because the moirè patterns can be caused by halftone screens beating with the output grid structure, the moirè pattern may be caused by a difference between the halftone screen pitch frequencies and the re-sampling rate frequency within the image forming apparatus. Even minor variations in dot position caused by systematic errors such as quantization round-off errors can produce moirè patterns resulting from beat frequencies between the periodic screens.

The perceived quality of the resulting color image is strongly dependent on the precision with which the color image separation layers are spatially registered with each other and the precision with which the halftone screens are oriented in relationship to a scan grid used by the image forming apparatus.

Additionally, conventional halftoning methods adjust or warp the image data produced by an image data generator, such as a grayscale image generator, or binary image generator, to minimize moirè, such as those disclosed in U.S. Pat. No. 5,732,162 to Douglas M. Curry, incorporated herein by reference in its entirety and U.S. Pat. No. 4,537,470 to Schoppmeyer.

However, merely warping the image data to minimize the moirè patterns results in offsets within the image data which have no corresponding adjustment or warp in the halftone screens used to render the color image separation layers. Therefore, moirè pattern minimization is conventionally improved by also warping halftone screens in a halftone screen system to correspond to the warping of the image data, as disclosed in U.S. Pat. No. 5,485,289 to Curry, incorporated herein by reference in its entirety. The '289 patent provides a detailed discussion of warping both image data and halftone screens.

Another conventional method for minimizing moirè maximizes the screen angles between the halftone screens. This is done because increasing the screen angles reduces the prominence of moirè because interference between the image separation layers is more frequent but to a lesser degree.

Initially, maximizing the angular displacement between the screens to minimize moiré might suggest that line screens should be used for halftoning color images, because a line screen is rotationally symmetric only every 180°, while a dot screen is rotationally symmetric every 90°.

Thus, for example, when printing a four color (CMYK) halftoned image with a line screen, an average allowable separation-to-separation screen displacement angle is 45°. This means that the respective image separation layers may be printed with a line screen oriented at, for example, 0°, 45°, 90° and 135° relative to each other.

Moiré can degrade the image when the color image separation layers that are screened at relative orientations of 0° and/or 90° overlap the color image separation layers that are screened at relative orientations of 45° and/or 135°. Alternatively, if a dot screen is used for halftoning the four color image separation layers of the image, the average allowable screen displacement angle is 22.5°. As a result, there is more opportunity for moiré when the screen orientations are closely spaced.

Just as errors in frequency and angle can cause moiré, so can imperfections in the scanner, or set of scanners, which provide the scan structure for the printer. If the respective scan structure for all four color layers do not exactly overlap, the halftones can be mis-registered so as to be another source of moiré.

The halftone marks, especially dots, must periodically be placed so that the centers of the dots do not exactly line up with the scan structure of the marking device to make halftones at exactly the right frequency or angle or to compensate for non-overlapping scan structures to avoid the pitfalls of moiré. This offset of the halftone marks from the scan structure is referred to as being out of phase. Obviously, not all frequencies, angles or registration corrections may be printed by the marking device without periodically being forced to place marks out of phase.

Increasing the quantization of the marking device can provide more in-phase places to place marks. Typically, a laser marking device, such as a polygon scanner, favors the fast scan direction with high quantization over the process or scan pitch direction, which generally has a coarser quantization. Therefore, halftone dots, which go out of phase in two dimensions when rotated at some arbitrary angle or warped to compensate for some arbitrary error, are more difficult to place in their proper positions because the process direction limits their placement precision. A line screen, on the other hand, can be made to be more or less perpendicular to the fast scan direction, which is the highest quantization direction, so that the line screen mark can be placed with higher precision in that direction.

SUMMARY OF THE INVENTION

Despite the greater average screen displacement angle provided by using line screens, dot screens generally are preferred for printing color halftone images because dot screen structures usually provide a greater dynamic tone range. Thus, this invention provides tone-variation-resistant phase-shiftable halftone screen systems and methods that perform color image halftoning.

The invention separately provides systems and methods that adjust the image data in conjunction with adjusting the halftone screens.

This invention separately provides systems and methods that adjust the image data and the halftone screens based on imperfections of an image forming apparatus to provide improved image rendering.

The invention separately provides systems and methods that halftone multicolor images by rendering the hexagonal dot screen image separation layer without warping the hexagonal halftone screen, while warping two of the line screens to register the resulting line screened image separation layers with the dot screened image separation layer.

The tone-variation-resistant halftone screen systems and methods of this invention use the relatively large average screen displacement angles offered by line screening while providing a dynamic tone range performance similar to that of the performance of dot screening. In other words, the halftone screen systems and methods of this invention combine the best features of line screening and dot screening for rendering halftone color images.

An exemplary embodiment of the methods and systems according to the invention uses line screens for halftoning the chromatic image separation layers of color images and a hexagonal dot screen for halftoning the luminescent image separation layer. For a four separation layer color image, two of the three line screens are tilted, i.e., oriented at other than 90° angles, from the horizontal or vertical axes. This orientation allows for easy adjustment of vertical positions of rendered marks by horizontally adjusting the horizontal position of the tilted lines screens. Therefore, dot position in the vertical, i.e., slow-scan, direction, can be adjusted by moving the tilted line screen in the horizontal, i.e., fast-scan, direction. This improves operation because adjustment of the line screens in the fast-scan direction is easier to control.

For example, when printing CMYK halftone images, a hexagonal dot screen is used to print the luminescent image separation layer, e.g., the black image separation layer. The black image separation layer is registered with and printed to be coincident with the output grid structure by registering the hexagonal dot screen with the output grid structure. The chrominance image separation layers, e.g., cyan, magenta and yellow, are each printed using line screens. The two tilted line screens carry the cyan and magenta layers, and are one-dimensionally warped to be concentric or collateral with the periodic hexagonal lattice structure resulting from registering the hexagonal dot screen with the output grid structure. The third line screen, which is parallel with the scanning laser, is also one dimensionally warped to coincide with the hexagonal dot lattice, but since it is carrying the yellow layer, it is less susceptible to the effects of moiré than the cyan and magenta layers. Therefore, the three line screens become concentric with the hexagons defined by the hexagonal lattice structure to maximize the dynamic tone range and minimize moiré of the luminescent image separation layers.

The adjustment of the halftone screens provided by the systems and methods of this invention is an improvement over conventional methods for warping halftone screens because the adjustment provided by the systems and methods of this invention involves only one-dimensional warping of the tilted line screens, rather than the two-dimensional warping of halftone dot screens as previously required in, for example, the methods disclosed in the incorporated '289 patent.

The systems and method of this invention may be advantageously used in conjunction with electronic registration of the image separation layers using tagged, antialiased bytemaps provide improved image rendering. However, using such tagged, antialiased bytemaps is not necessary.

These and other features and advantages of this invention are described in, or are apparent from, the following description of the apparatuses and methods according to this invention.

BRIEF DESCRIPTION OF THE DRAWINGS

Various embodiments of this invention will be described in detail, with reference to the following figures, wherein.

DETAILED DESCRIPTION OF PREFERRED EMBODIMENT

Figure 1:
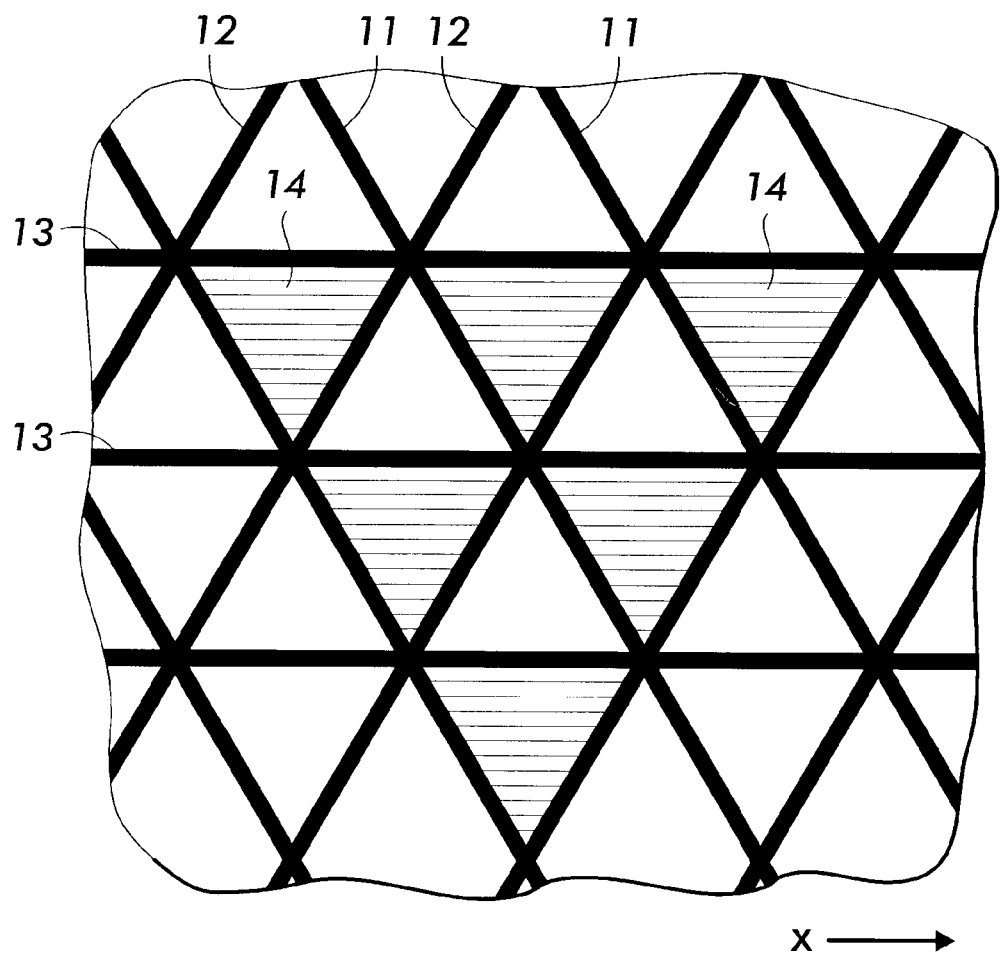
FIG. 1 illustrates a two-dimensional spatially periodic layout of the line screens and the dot screen employed in accordance with an exemplary embodiment of this invention.

Many of the more popular printing processes print images by depositing image-like patterns of "ON" and "OFF" pixels on a suitable recording medium. Some of these binary print engines employ direct marking technologies, such as ink jet printing, while others utilize indirect marking technologies, such as xerography. Therefore, although the exemplary embodiment of the systems and methods described below focus on the utility of the halftone screening system in connection with xerographic image forming systems, it should be understood that the halftone screening systems and methods of this invention are useful in conjunction with any known or later developed binary printing systems and methods in general.

The systems and methods of this invention use electronic registration to map image data, using a resampling interpolator, into the systematic errors inherent in the image forming apparatus, while using electronic registration in a halftone data generator to one-dimensionally warp the tilted line screens in accordance with the luminescent image separation layer produced by the hexagonal dot screen. Two-dimensional warping of the halftone screens is accomplished by one-dimensional warping, i.e., adjusting the tilted line screens solely in the fast-scan direction. For example, an (infinitely long) tilted line may be adjusted up or down by moving left or right.

Electronic registration of the image data is described in detail in the incorporated '162 patent. Electronic registration of the image data and the halftone screens is discussed in the incorporated '289 patent. Using a resampling interpolator, electronic registration warps the image data based on imperfections of a raster output scanner or other image forming apparatus to provide improved image rendering. Using electronic registration, data is mapped into the imperfections of the image forming apparatus, such as, for example, in a raster output scanner, imperfections caused by scan non-linearity errors, polygon signature errors, and motor hunt errors.

Further, suppose a printhead in the image forming apparatus such as an ink jet or LED light bar printer meanders along the path of printing. If the pattern of meandering is known, the pattern of meandering can be compensated for. Therefore, by knowing the location of the exposed spots produced by the meandering printing path and developing a relationship between printing path and the resulting exposure, electronic registering and interpolating the image data can compensate for such systematic errors. The image data acts as a rubber sheet of data that is mapped onto the imperfections of the image forming apparatus. As a result, the image data is re-sampled along lines curved in conformance with the imperfections of the image forming apparatus. Thus, when an image forming apparatus properly compensates for ordinary printing errors, the color image separation layers of a halftoned image can be effectively registered with each other to sub-scan precision.

However, as discussed above, warping the halftone screens two-dimensionally to two-dimensionally electronically register the halftone screens and the output grid structure is difficult. However, the image data can easily be warped by the resampling interpolator, if a halftoning technique is used in a halftone data generator that is immune to the effects of misregistration.

Further, if phase shifting of halftone dots is necessary, such as when the center of a halftone dot to be rendered is not coincident with the output grid structure, then the uniformity of rendered halftone dots becomes an issue. Phase shifting refers to the movement of a halftone dot in relation to the output grid structure. The position of the center of the halftone dot with respect to the output grid structure can be referred to as the dot phase. A dot is out of phase if the center of the dot is not coincident with the output grid structure.

Conventionally, when dot phase changes, the tone of a constant-intensity dot may vary. That is, the image forming apparatus may be unable to render the dot with a constant tone when the dot phase changes. Ideally, even as a dot is phase shifted, the image forming apparatus should produce uniform shape and size halftone dots, regardless of the phase shift.

Modulating the image forming device at a higher rate and warping the halftone screens two-dimensionally improves the electronic registration of the halftone screens and the output grid structure. However, warping the halftone screens two-dimensionally is difficult because it requires two-dimensional registration of the halftone screens and the image data. This occurs because phase-shifting in both the vertical and horizontal directions increases the difficulty of maintaining the uniformity of the rendered dot sizes and shapes.

Therefore, the systems and methods of this invention one-dimensionally warp the tilted line screens to two-dimensionally register the line screens with the warped image data. The result is tone-variation-resistant phase-shiftable halftone screen systems and methods. The tone-variation-resistant phase-shiftable halftone screen systems and methods use a set of four screens: line screens for rendering each of three color image separation layers, e.g., the cyan, magenta and yellow image separation layers, or the red, blue and green image separation layers, and a dot screen for rendering the black image separation layer. In the following discussion, the systems and methods of this invention will be described with reference to the three line screens, each used to render one of the cyan, magenta and yellow image separation layer.

FIG. 1 is a layout diagram of three frequency-matched, spatially-periodic line screens and a frequency-tuned, spatially-periodic dot screen employed in accordance with the systems and method of this invention for halftoning the chromatic and the neutral luminescence image separation layers of a halftone color image. The three line screens 11, 12 and 13 and the dot screen 14 are used in halftoning the cyan, magenta, yellow and black image separation layers, respectively, and form a hexagonal packing grid for a four-color halftone image. The three line screens 11, 12, and 13 are oriented at approximately 120°; 60° and 0°, respectively, relative to the fast-scan, i.e., horizontal, direction of the image forming apparatus, which is identified by the arrow x. Therefore, there is a relatively large screen-to-screen displacement angle of approximately 60°.

The attached Appendix sets forth one exemplary embodiment of a computer program implementing the halftone screen systems and methods of this invention.

The line screens 11, 12, and 13 are substantially axially aligned with the principal axes of a two-dimensional, spatially-periodic lattice structure. Therefore, the spatial frequency of the dot screen 14 is selected to match the spatial frequency of this lattice structure in the fast-scan and slow-scan directions. Accordingly, the line screens 11 (cyan), 12 (magenta) and 13 (yellow) are electronically registered in relation to the rectangular output grid structure, which is also coincident with the dot screen 14 to electronically register the CMYK image separation layers with each other.

According to this invention, the cyan line screen 11 and the magenta line screen 12 are tilted between the vertical and horizontal axes to enable warping, i.e., adjusting, of the line screens to conform the rendered chrominance image separation layers to the rendered luminance image separation layer provided using the unwarped hexagonal dot screen. Tilting the line screens improves the capability to control the positioning of rendered image dots because the tilted line screens may be moved in the slow-scan direction by moving the lines in the fast-scan direction. Moving the tilted line screens in the fast-scan direction is easier because it is easier to control process movements in the fast-scan direction. By using line screens to render the chrominance image separation layers, the systems and methods of this invention provide significantly improved edge placement precision. This occurs because moving the line screens in increments of fractions of integers in the slow-scan direction is provided by moving the line screens in increments of fractions of integers in the fast-scan direction.

The dot screen 14, used to render the black image separation layer, is not warped. The line screens 11 and 12, used to render the cyan and magenta image separation layers, are oriented at 30° from the vertical axis on opposite sides of the vertical axis. Therefore, the line screens 11 and 12 are easily moved to adjust a rendered dot position in the slow-scan direction by adjusting these lines screen's positions in the fast-scan direction. Line screen 13, the yellow image separation layer, is warped in the slow or process direction, causing moiré. However, due to the human visual system's difficulty in seeing moiré resulting from yellow, the line screen 13 can be substantially moved up or down with greater ease than if it were cyan or magenta.

Orienting the line screens 11 and 12 used to render the cyan and magenta image separation layers in this way minimizes the moirè patterns because edges of rendered image marks are positioned based on a portion of an output-dimension determined by the addressability of the image forming apparatus. That is, the ability to precisely position the rendered image marks is based on the number of re-samplings performed for every scanline of the image forming apparatus. This is because minimizing the moiré pattern is based, at least in part, on the ability to accurately position the edges of marks in a rendered image to sub-pixel precision. Even if high addressability, e.g., eight times re-sampling per scanline, is available, an edge of a mark can only be positioned within an eighth of a pixel of where the edge should be positioned.

Therefore, the extent with which the halftone screen accurately positions a mark edge is the precision provided by the quantization of the fast scan addressability. Depending on the frequency of the halftone screen, which is theoretically the same frequency as the re-sampling frequency of the image forming apparatus to minimize the moiré patterns caused by beating between the halftone screens and the output grid structure, this precision may not allow for positioning the edge at one of the eight high-addressability positions provided every re-sample. Therefore, there is an offset, or error, between the desired position of the mark edge and the actual position of the rendered mark edge. This offset error is one example of the systematic errors from which halftone images suffer.

However, using line screens that are tilted away from the vertical direction allows warping of these line screens in the fast-scan direction with two to eight times the resolution as in the slow-scan direction. Halftoning using dot screens alone is more difficult because the dots require warping in two dimensions, and there is not enough addressability in the slow scan direction to accomplish this without inadvertently changing the tone of the out-of-phase dots. Therefore, the tone-variation-resistant halftone screen systems and methods of this invention improve on the operation of the image forming apparatus by warping the tilted line screens 11 and 12 in the fast-scan direction to provide increased horizontal and vertical positioning control. The systems and methods of the present invention are particularly useful in image forming apparatuses with lower scan pitches, e.g., 600 scans per inch. In comparison with the control conventionally provided by directly adjusting the slow-scan direction position, the systems and methods of this invention provide two to eight times the resolution conventionally available in the slow-scan direction.

Therefore, according to the systems and methods of this invention, halftone dot positions and mark edge positions are adjusted in the slow-scan direction by adjusting positions in the fast-scan, direction. Because the line screens 11 and 12 contain tilted lines, adjusting the location of a point in the fast-scan direction also adjusts the location of that point in the slow-scan direction. As a result, the line screens 11 and 12 are warped around the dot screen 14 while the dot screen 14 remains unwarped.

The line screen 13 used to render the yellow image separation layer is oriented along the horizontal axis. There may be some residual error in the electronic registration of the color image separation layers in the slow-scan directions because of inherent quantization errors in the printing process. However, because the line screen 13 is oriented along the horizontal direction, adjusting the position of the line screen 13 in the fast-scan, i.e., horizontal, direction does not alter the vertical position of the line screen 13. Therefore, the line screen 13 should be used to render the least noticeable chromatic image separation layer, e.g., the yellow image separation layer. The line screen 13 is used to position the yellow image separation layer along the horizontal axis, because the yellow image separation layer is most easily responsive to reducing moirè caused by systematic errors in response to injecting pseudo random noise into the image data for the yellow image separation layer. Additionally, the luminosity of yellow makes moirè easy to wash out.

Figure 2:
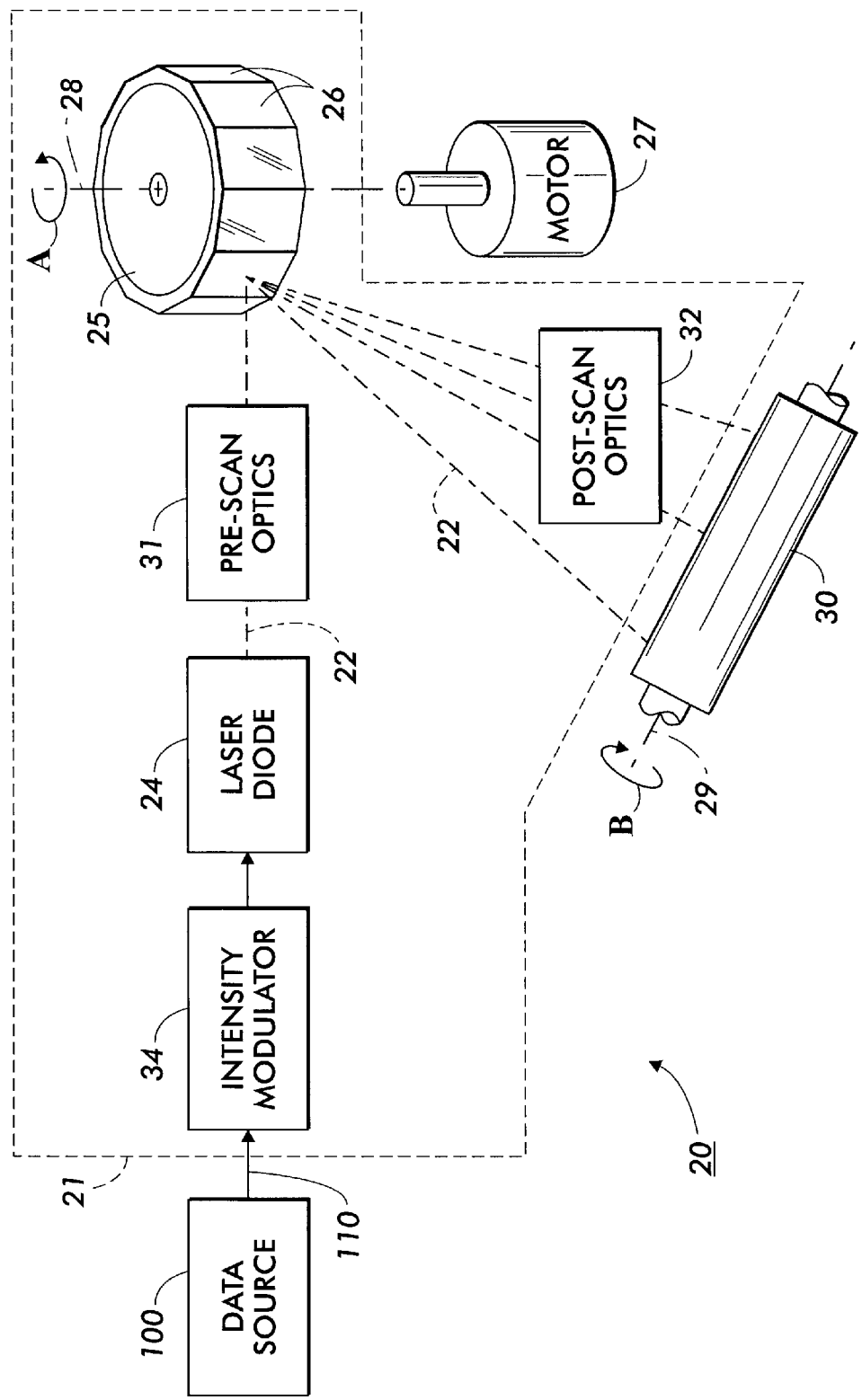
FIG. 2 schematically illustrates an example of a xerographic laser printer.

Referring to FIG. 2, hyperacuity xerographic laser printing is an example of a known printing technology for which the systems and methods of this invention are well suited. FIG. 2 shows a xerographic print engine 20 with a conventionally-configured flying spot raster output scanner 21. The raster output scanner 21 scans one or more data-modulated light beams 22 over a xerographic photoreceptor 30 in accordance with a predetermined raster scanning pattern. The raster output scanner 21 comprises a laser diode 24 and a polygon scanner 25. The laser diode 24 emits the one or more light beams 22 at visible or invisible frequencies, such as an infra-red frequency. The rotating polygon scanner 25 has a plurality of nearly identical, mirror-like exterior sidewalls or facets 26.

A motor 27 rotates the polygon scanner 25 about a central axis 28, as indicated by the arrow A, at a substantially constant angular velocity. The polygon scanner 25 is positioned between the laser diode 24 and the photoreceptor 30. The polygon scanner 25, as it rotates, scans the one or more laser beams 22 across the surface 30 of the photoreceptor 30 in a fast-scan direction. The photoreceptor 30 is simultaneously advanced in the orthogonal process, or slow-scan, direction about a central axis 29 at a substantially constant linear velocity, as indicated by the arrow B. Accordingly, the one or more laser beams 22 scan the photoreceptor 30 in accordance with a raster scan pattern, i.e., the output grid structure.

As shown in FIG. 2, the photoreceptor 30 is a photosensitive rotating drum. However, the photoreceptor 30 also can be implemented as a photosensitive belt or any other known or later-developed structure.

The raster output scanner 21 also includes pre-scan optics 31 and post-scan optics 32 that focus the one or more laser beams 22 to a generally circular or elliptical focus with a gaussian intensity profile and proximate to the photoreceptor 30. The pre-scan optics 31 and the post-scan optics 32 also provide any optical correction that may be needed to compensate for scanner wobble, off-axis impingement of the one or more laser beams 22 and other optical irregularities. Preferably, the optical aperture of the raster output scanner 21 is sufficiently large to avoid excessively truncating the one or more laser beams 22.

The raster output scanner 21 is connected to a data source 100 that provides image data. The data source 100 may be implemented separately from the print engine 20 or integrated as a part of the print engine 20. The print engine 20 is connected to the image data source 100, over a signal line or link 110. In general, the image data source 100 can be any one of a number of different sources, such as a scanner, a digital copier, a facsimile device that is suitable for generating electronic image data, such as a client or server of a network, or the Internet, and especially the World Wide Web. Thus the image data source 100 can be any known or later developed source that is capable of providing image data to the print engine 200.

The raster output scanner 21 also includes an intensity modulator 34 that modulates the intensity of the laser beams produced by the laser diode 24 to temporally and spatially modulate the laser beam based on information provided by the data source 100. The intensity modulator 34 is preferably implemented as hardware comprising a plurality of discrete circuit elements. However, the intensity modulator 34 can also be implemented on a programmed general purpose computer, a special purpose computer, a programmed microprocessor or microcontroller and peripheral integrated circuit elements, an ASIC or other integrated circuit, a digital signal processor, a hardwired electronic or FPGA or PAL, or the like.

Moreover, the intensity modulator 34 can be implemented as software executing a programmed general purpose computer, a special purpose computer, a microprocessor or the like. In this case, the intensity modulator 34 can be implemented as a routine embedded in a printer driver, as a resource residing on a server, or the like. The intensity modulator 34 can also be implemented by physically incorporating it into a software and/or hardware system, such as the hardware and software systems of a printer or a digital photocopier. In general, any device, capable of implementing a finite state machine that is in turn capable of implementing the halftone adjusting methods described herein used to implement the intensity modulator.

Figure 3:
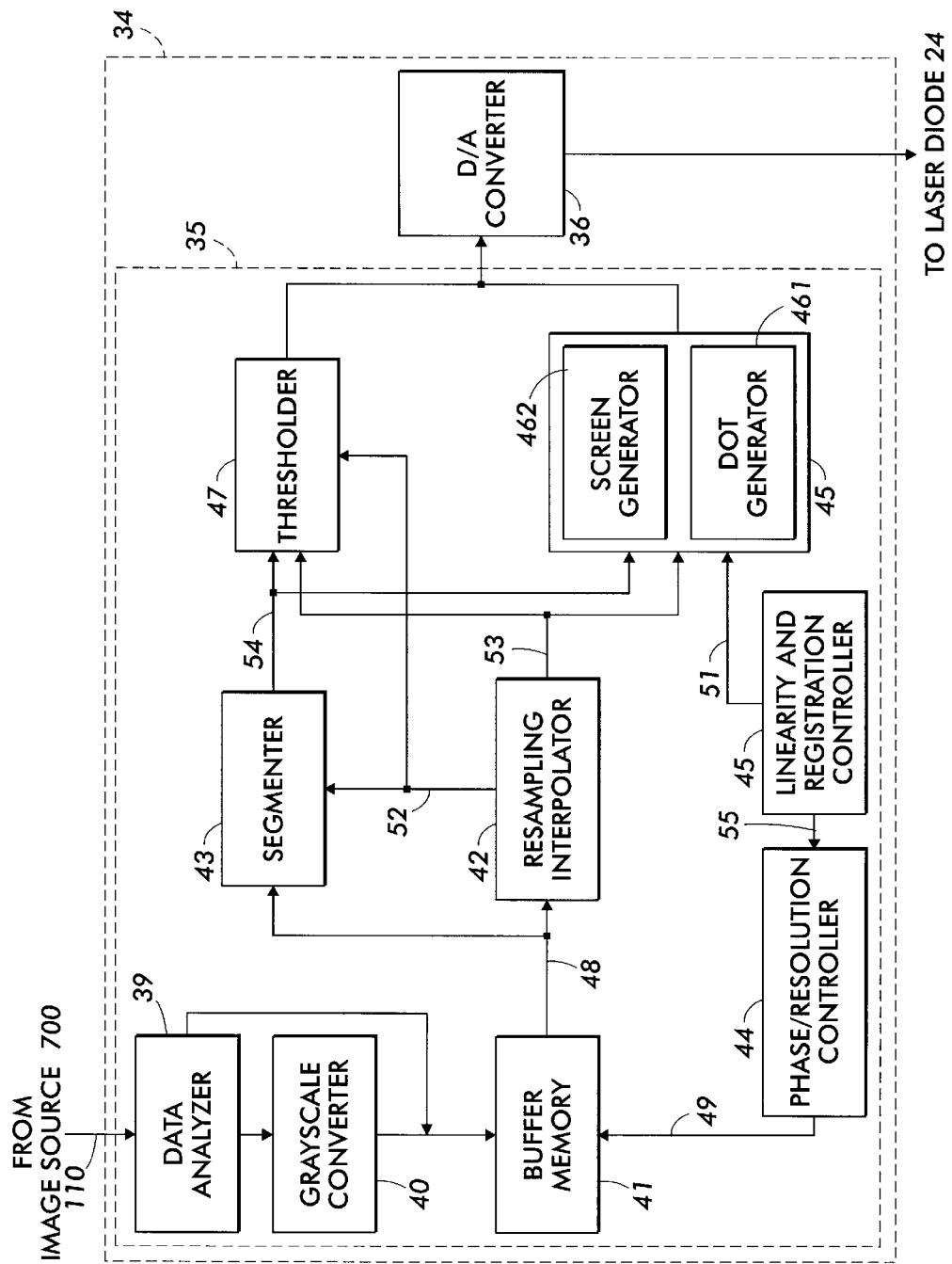
FIG. 3 schematically illustrates an electronic subsystem for performing hyperacidity printing with the printer shown in FIG. 2.

As shown in FIG. 3, the intensity modulator 34 includes an electronic subsystem 35 and a digital-analog converter 36 that process grayscale image data to modulate the laser diode 24. The electronic subsystem 35 modulates the laser beam 22 to render text and other lineart image data and halftone image data. The data source 100 provides the electronic image data to a data analyzer 39 of the intensity modulator 34. The data analyzer 39 analyzes whether the data is grayscale image data, binary image data, etc.

If the data analyzer 39 determines that the data from the data source 100 is not grayscale image data, the data analyzer transmits the image data to the grayscale converter 40 where the image data is converted into grayscale image data. The grayscale converter then transmits the converted grayscale image data the to buffer memory of the intensity modulator 34. Otherwise, the data analyzer 39 transmits the grayscale image data to the buffer memory 41. The grayscale image data may represent a scanned-in image for digital copying or a synthetic computer generated image for computer printing. For hyperacuity printing, the grayscale image data is processed by the electronic subsystem 35 to modulate the laser diode 24 with sufficient precision to control the positioning of the edges within the image to a sub-pixel precision.

The scan pitch of the laser beam 22 in the slow-scan direction can be set to be a moderate fraction of the diameter of the laser beam 22, as measured between the laser beam half power points on the photoreceptor 30, i.e., the so-called full-width, half-max, or "FWHM", diameter of the spot produced by the laser beams 22. This may cause the laser beam 22 to "overscan" the photoreceptor 30 to some degree, which, in turn, enables the intensity modulator 34 to position the image edges to a subscan precision in the slow-scan direction in response to the modulation of the laser beam 22. An overscan between 1× and 2× is recommended. For example, a 2× overscan, i.e., scan pitch is equal to one-half of the full-width, half-max spot diameter, enables a 600 pixels-per-inch resolution output grid structure with a modulatable laser diode 24 to operate in a substantially linear edge positioning response during mid-power operation of its nominal power level, i.e., the power level used when the diode is turned full on. Regardless of the overscan ratio, partial power operation allows the laser diode 24 to position edges in the printed image to a nominal precision in the slow-scan direction with subscan precision.

The effective output power of the laser diode 24 can be intensity modulated by pulse-width modulating, temporally modulating or analog modulating the laser beam 22 since power is a measure of the energy delivered per unit time. The intensity modulation of the laser beam 22 controls the positioning of the edges within the printed images to a similar precision in the fast-scan direction. However, this precision depends only on the temporal quantization of the laser beam 22 because the fast-scan scanning of the laser beam 22 is continuous.

The subsystem 35 includes a first-in, first-out (FIFO) memory 41, a resampling interpolator 42, a segmenter 43, a phase/resolution controller 44, a linearity and registration controller 45, a halftoner 46 and a thresholder 47. The halftoner 46 includes a dot generator 461 and a screen generator 462.

Data samples are sequentially clocked out of the resampling interpolator 42, under the control of the phase/resolution controller 44, and output to the halftoner 46 over a signal line 53. The dot generator 461 serially writes a plurality of pass specific families for serially halftoning the color image separation layers of a color halftone image during successive print passes of the print engine 20 (FIG. 2). For example, if the print engine 20 is configured for four-pass, four-color (CMYK) rendering of color images, a two-bit pass number dependent value is applied to the dot generator 461 to cause it to write the appropriate one of four different families of fill patterns for each print pass of the print engine 20. If the halftone system is used in a tandem print engine configured for single-pass rendering of halftoned color images, it is not necessary for the dot generator 461 to write fill patterns because such a print engine would have a dedicated halftoner with a pre-loaded memory for each of the color image separation layers. Otherwise, however, the same principles of operation apply.

As shown in FIG. 3, the grayscale image generator 38 outputs the grayscale image data to the BUFFER MEMORY 41. The grayscale image generator 38 produces the gray input data used for the hyperacuity system. The BUFFER MEMORY 41 stores the grayscale image data and outputs the grayscale image data to the resampling interpolator 42 and the segmenter 43 over a signal line 48 based on signals received from the phase/resolution controller 44 over a signal line 49. The phase/resolution controller 44 receives control signals from the linearity and registration controller 45 over a signal line 50. The linearity and registration controller 45 also outputs control signals over a signal line 51 to the halftoner 46.

The resampling interpolator 42 outputs linear data and two-dimensional slope information to the segmenter 43 and the thresholder 47 over one or more signal lines 52. The resampling interpolator 42 outputs lineart data and two-dimensional slope information to the thresholder 47 and resampled intensity value information to the halftoner 46 over one or more of the signal lines 53. The paths from the resampling interpolator 42 to the halftoner 46 and thresholder 47 provide the split data path architecture necessary for hyperacuity printing. The segmenter 43, using the two-dimensional slope information, provides a switching signal to the thresholder 47 and the halftoner 46 over a signal line 54. The segmenter 43, thus, selects either the halftone data path or the threshold data path.

Typically, the image data is pre-processed by a data segmentation system, not shown, included, for example, in the data analyzer. The data segmentation system determines whether the image data portions represent lineart or toneart and adds a single bit tag to each of the samples to indicate the result of the segmentation and directs the text/lineart to the grayscale converter and the toneart directly to the BUFFER MEMORY 41. The segmenter 43 responds to the state of the tag bits for the grayscale data samples it receives to selectively switch back and forth between the threshold data path for rendering lineart image data and the halftone data path for rendering toneart image data.

The thresholder 47 and the halftoner 46 output hyperacuity image data to the digital-to-analog converter 36. The switching signal controls whether the hyperacuity image data output by the thresholder 47 or the halftoner 46 is input by the digital-to-analog converter 36. The digital-to-analog converter 36 converts the hyperacuity image data to analog values and outputs the analog values to the laser diode 24 to modulate the intensity of the one or more laser beams 22.

Focusing in more detail on processing the toneart image data, incoming grayscale data samples for a few scan lines, e.g., 4–8 scan lines, are stored in raster order in the BUFFER MEMORY 41, which is two-dimensionally addressable. This enables the image data to be addressed in both a fast-scan-dimension (x) and a slow-scan-dimension (y). This memory 41 has a write port for receiving the incoming samples, a read port for transferring data samples for a pair of neighboring scan lines to the resampling interpolator 42, and two address ports for receiving x and y addresses from the phase/resolution controller 44. These addresses are never incremented by more than one at a time, so the memory 41 behaves as a FIFO buffer. However, the address increment timing of the incrementing action is controlled by the phase/resolution controller 44, typically as a function of the instantaneous position of the laser beam 22 as it raster scans the photoreceptor 30 as shown in FIG. 2. A complete discussion of the controller 44 is set forth in the incorporated '162 patent.

The resampling interpolator 42 effectively decouples the pixel density of the printed output image from the input image data resolution. That is, if the pixel density is to be increased, the resampling interpolator 42 performs a generally linear extrapolation on neighboring data samples of the input image data in the x and/or y-dimensions of the image and resamples the extrapolated data samples to increase the data density. Alternatively, if the pixel density is to be decreased, the resampling interpolator 42 performs a generally linear interpolation operation on neighboring (filtered) data samples of the input image data in the x and/or y-dimensions of the image and resamples the interpolated data samples to decrease the data density.

The resampling interpolator 42 performs actuation in increments of the addressability, e.g., 5 $\mu$s quantization at 4800 pixels per inch. Therefore, warping the halftone screens to conform with warping of the image data performed by the resampling interpolator 42 requires that the halftone screens also be addressable by the same incremental addressability, e.g., 5 $\mu$s in quantization at 4800 pixels per inch.

One novel aspect of the ton-variation-resistant halftone screen systems and methods of this invention is the integration of the dot screen 14 for the black image separation layer with line screens 11, 12 and 13 for the cyan, magenta and yellow chromatic image separation layers. However, the construction and operation of a suitable halftoner 46 for the print engine 20 is described in some degree of detail in the incorporated '289 patent and thus need not be described herein. Accordingly, only a functional overview of the halftoner 46 will be set forth herein.

Functionally, the halftoner 46 transforms the grayscale toneart samples it receives into generally faithful, perceptually-well-blended, binary representations, i.e., binary images of the toneart source images that appear essentially grainless and contour-free to the unaided eye of the ordinary observer. For halftoning images and the respective image separation layers of color toneart images represented by 8-bit samples, dot generator 461 includes a memory 190, illustrated in FIGS. 4 and 5, that is logically organized to have 256 uniquely addressable "intensity planes." A one-to-one-mapping from the 256 8-bit resolvable grayscale values to the logical addresses of these intensity planes causes each of the possible grayscale values to address a predetermined intensity plane. In other words, the intensity planes of the memory 190 are individually assigned to resolvable grayscale values.

All of the intensity planes of the memory 190 have the same internal logical organization because the intensity planes are internally organized to allow the halftoning process to take advantage of the hyperacuity of the print engine 20. If the print engine 2 is designed to print at a resolution of 600 pixels per inch and configured to provide eight intermediate power levels, horizontal edges in the printed images can be positioned to a precision of $\frac{1}{4800}$th of an inch by adjusting the laser diode 24 power, on a pixel-by-pixel basis, to operate the laser diode at 0%, 12.5%, 25%, 37.5%, 50%, 62.5%, 75%, 87.5% or 100% power points, while printing the respective pixels of the image or the color image separation layers of a multicolor image. Vertical edges can be positioned to a 4800$^{th}$ inch precision by allowing the system clock frequency to be 4800 clocks per inch.

A 600 pixels-per-inch resolution print engine suitably renders halftone images at a spatial screen frequency of about 150 screen elements, e.g."dots" or "lines", per inch. Therefore, to enable the halftoner 46 to render halftones at this screen frequency while controlling the edges of the screen elements to a precision of 1/4800th of an inch, each of the intensity planes of the memory 190 comprises a two-dimensionally addressable, 32×32 matrix of logically ordered, two-dimensionally addressable, multi-bit memory locations for storing digitally-encoded modulation-control signals for the laser diode 24. The bit-width of these memory locations is, of course, selected to accommodate the bit length of the codes used to encode the laser control signals.

More particularly, the memory matrix for each of the grayscale addressable intensity planes of the memory 190 shares a spatially-ordered, pixel-by-pixel, digitally-encoded description of the laser control signals for rendering images and image areas having a grayscale value corresponding to the address of the intensity plane in accordance with a predetermined halftone screen. The granularity of this description matches the edge positioning precision of the rendering process so the screen edges are positioned with hyperacuity precision.

For example, in the illustrated exemplary embodiment, the 600 pixels-per-inch resolution print engine 20 uses a 2× overscan while rendering halftone images at a spatial screen frequency of 150 screen elements per inch. The 32×32 memory matrix for each intensity plane of the memory 190 permits the laser control signal for each pixel to be modulated as a function of the position of the pixel to a precision of 1/8th of a pixel in both the fast-scan direction and the slow-scan direction. This permits the positioning of the edges of the screen elements to be controlled to a precision of 1/4800th of an inch in the halftoned images. For rendering successive color image separation layers of color halftone image in accordance with different halftone screens, separate families of encoded laser control signals are synchronously transferred in the dot screen generator 461 to the memory matrices of the respective intensity planes of the memory 190 for rendering the respective color image separation layers. The laser control signals for each of the intensity planes of the memory 190 and each of the halftone screens are selected to compensate for the tone reproduction curve of the print engine 20, so that the print engine 20 has a generally linear response.

The intensity modulator 34 uses the digital-to-analog converter 36 to control the laser intensity for driving the laser diode 24 using the intensity values obtained as described above. There are various forms of digital-to-analog converters, all of which can be used. A classic digital-to-analog converter can generate grayscale output electronically and timing information depending on how quickly the digital-to-analog converter can change values. A pulse-width modulator can generate grayscale data depending on the width of the data output and timing information based on the positions of the rising and falling edges of the generated pulse. A counter can also generate an output that turns the laser diode 24 on and off. A high speed shift register can generate grayscale data by dithering its bits from on to off or from off to on. The dithering procedure can be the same as that disclosed in U.S. Pat. No. 5,216,443, to Curry, which is incorporated herein by reference in its entirety.

Figure 4:
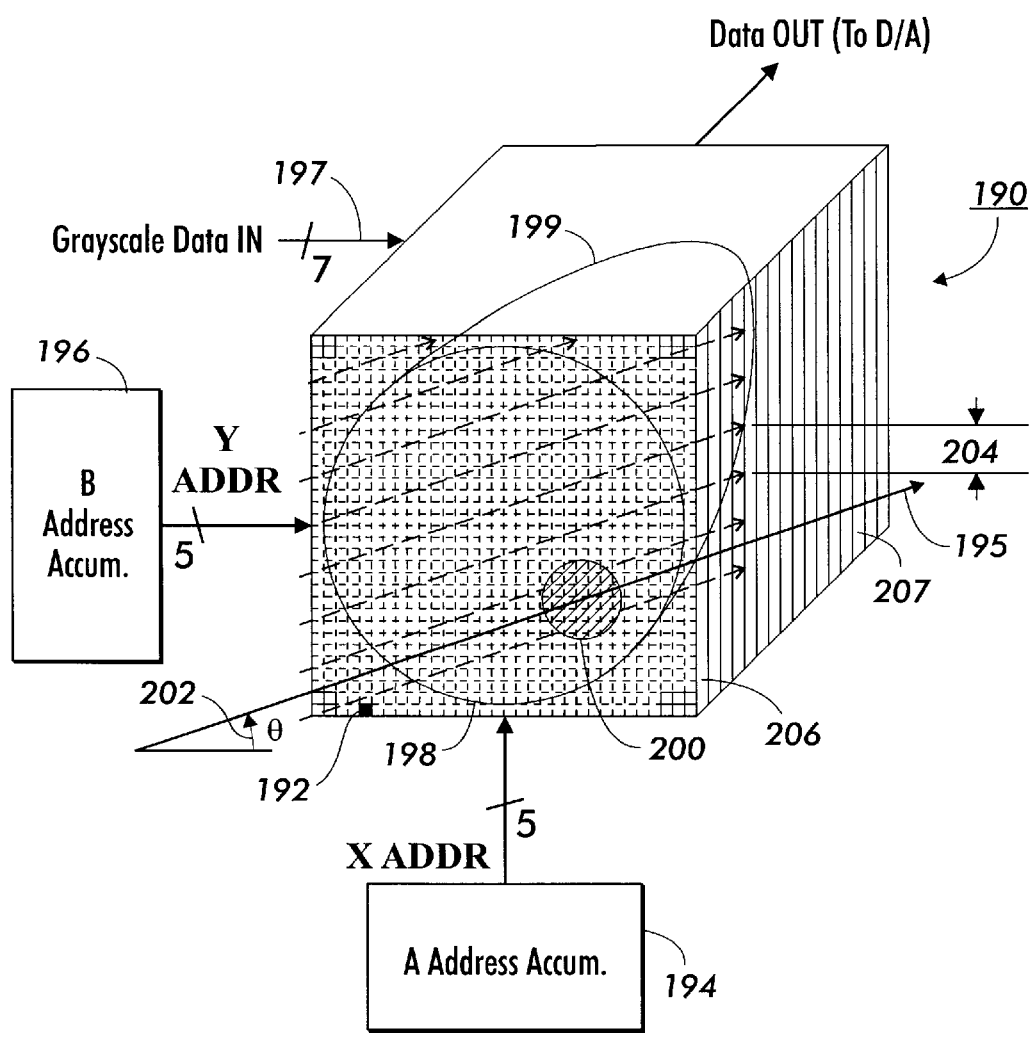
FIGS. 4 and 5 illustrate a halftoner that uses the halftone screen system of this invention.

FIG. 4 illustrates one exemplary embodiment of the high addressability halftoner 46 of this invention in greater detail. As mentioned above, the halftoner 46 includes a dot generator 461 and a screen generator 462. The memory block 190 is part of the dot generator 461 and the accumulators 194 and 196 are part of the screen generator 462. The memory block 190 is divided into an array of addressability units 192, which correspond to the pixels in the output image. The memory block 190 is also divided into 256 different dot planes, one for each grayscale data level, as described above. The fast-scan direction is designated by arrow 195. The slow-scan direction is designated by arrow 204. The addressability in the fast-scan direction is 1/4800$^{th}$ of an inch and the scan spacing in the slow-scan direction is 1/1200$^{th}$ of an inch.

As shown in FIG. 4, the data stored in the memory 190 is represented as a slice through the intensity-dimension of a three-dimensional object by dividing its address lines into three sets, one for the x-dimension, one for the y-dimension and one for the intensity-dimension. These addresses are provided by the A address accumulator 194, the B address accumulator 196 and the grayscale data input line 197. The A and B address accumulators provide the x and y components, respectively, of a screen address used for rotating a screen of the halftone screen system, such as shown by the angle 202. This address information represents the position of laser diode spot 200 in the x,y plane. By adjusting the increment values being accumulated, variations in the screen angle and frequency may be achieved to implement screen warping.

As shown in FIG. 4, for the intensity-dimension, the grayscale data input 197, from the resampling interpolator 42, determines which one of the 256 dot planes, such as dot planes 206 or 207, is being accessed. Typically, as the value for the grayscale data 197 changes, the radius (or other density determining parameter) of the halftone dot changes, as represented by the three-dimensional "bullet" shape 199 in FIG. 4. One of the 256 halftone dots, this one in the midrange where the memory has been sliced, is shown as halftone dot profile 198 in dot plane 206. If a highlight dot is to be rendered, the grayscale data in 197 will select a dot plane with a dot profile that has a small radius, such as might be in plane 207. A shadow dot would be on the other side of plane 206 from 207 and is not shown.

Figure 5:
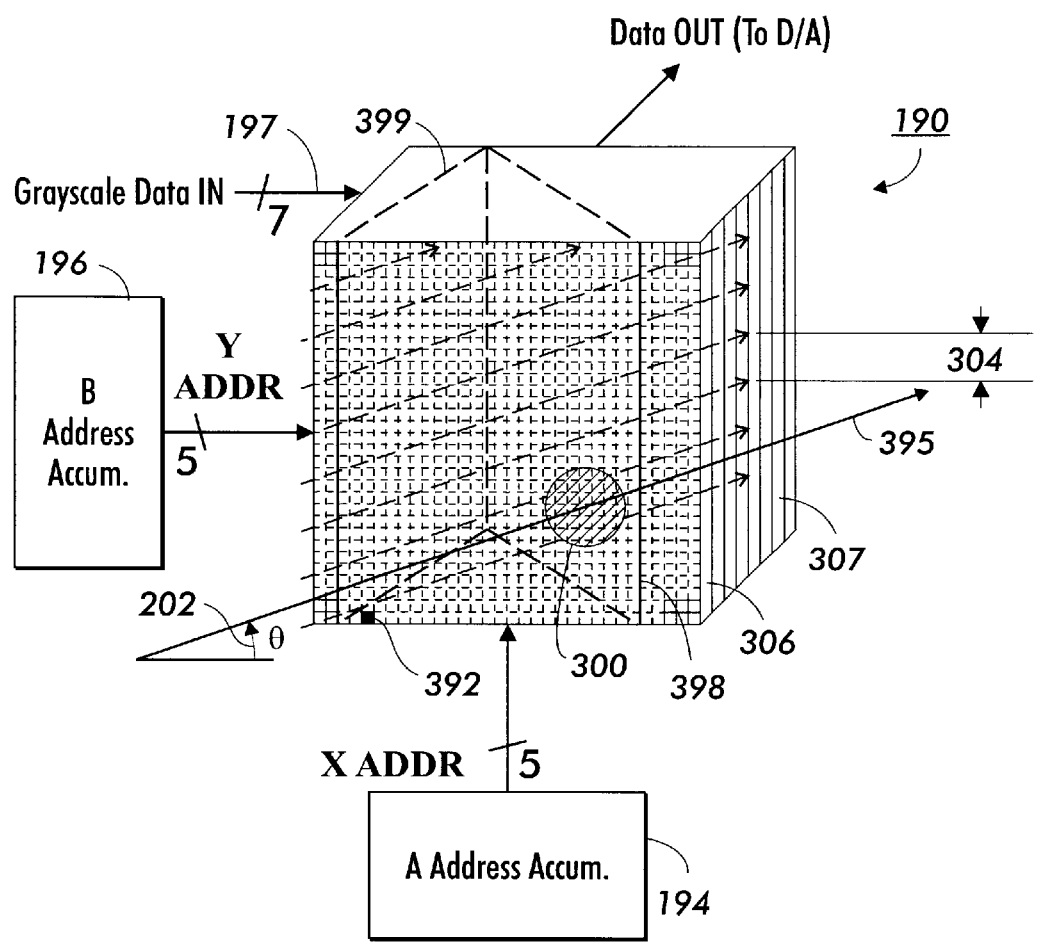

FIG. 5 illustrates the high-addressability halftoner 46 of FIG. 4 implementing a line screen as indicated by the wedge shape of the object within the memory block 190. Using the halftoner 46 to render images using dot screen or line screens is based on the mathematical data provided to the accumulators 194 and 196. Using the halftoner 46 in conjunction with the halftone screen system, including the tilted lines of the cyan and magenta line screens 11 and 12, allows the halftone dots to be precisely positioned in the fast-scan direction and the slow-scan direction even though the position of the dot is adjusted only in the fast-scan direction. This occurs because the line screens are tilted between vertical and horizontal axes. Therefore, the image separation layers produced by the tilted line screens may be moved at increments of 4800 pixels-per-inch in both the fast-scan and slow-scan directions, because movement in the slow-scan direction can be produced by movement in the fast-scan direction. The halftone screen system of this invention works well with this halftoner 46 because the halftoner 46 has a significantly better addressability capability in the fast-scan direction than the slow-scan direction.

As shown in FIG. 5, for the intensity-dimension, the grayscale data input 197, from the resampling interpolator 42, determines which one of the 256 line planes, such as line planes 306 or 307, is being accessed. Typically, as the value for the grayscale data 197 changes, the width of the halftone line (or other density determining parameter) of the halftone line changes, as represented by the three-dimensional "wedge" shape 399 in FIG. 4. One of the 256 halftone lines, this one in the midrange where the memory has been sliced, is shown as halftone line profile 398 in line plane 306. If a highlight halftone dot is to be rendered, the grayscale data in 197 will select a line plane with a line profile that has a small width, such as might be in plane 307. A shadow halftone dot would be on the other side of plane 306 from 307 and is not shown.

Each halftone screen used in the tone-variation-resistant phase-shiftable halftone screen system is a regular rectangular array of dot positions covering the entire image. Regardless of whether a dot screen or line screen is implemented, accumulators 194 and 196 track the trajectory of the laser spot 200 as shown by line 195. The trajectory of the laser spot 200 moves through the memory 190 at a screen angle θ shown as arrow 202. The five bits from each of the accumulators provide a thirty-two by thirty-two position halftone tile for defining a halftone dot for each of the 256 halftone dots addressed by grayscale input value 197. Therefore, there are a total of 1024 positions within each tile defining a given halftone dot.

Rotating the angle of orientation of the halftone line screens is performed by altering the orientation angle 202 to change the orientation of the lines of the line screen with respect to the fast-scan, i.e., process, direction indicated by line 195.

The accumulators 194 and 196 can contain and increment by fractional values of a pixel width and height to warp the halftone screens. Therefore, when the line screens are used to render the chrominance image separation layers, the accumulators 194 and 196 contain and/or increment by fractional values of the pixel width and height to warp the line screens around the hexagonal lattice structure associated with the luminance image separation layer rendered by the non-warped dot screen.

As the accumulators 194 and 196 increment, they provide their five most significant bits as address YADDR and XADDR to memory 190. As the accumulators increment, they periodically rollover in x and y, thereby replicating the halftone cell, into a regular two-dimensional array over the entire image area. While this is occurring, the intensity is varying, causing different dot layers to be accessed in the dot screen and line layers to be access in the line screens, thereby modifying the density of the image. By adjusting the increment values being accumulated, variations in the screen angle and frequency may be achieved to implement screen warping.

The tone-variation-resistant phase-shiftable halftone screen systems of this invention may be included in apparatuses, for example, but not limited to, scanners, facsimile machines, printers or digital copiers using, for example, raster output scanners or image bar scanners.

While the exemplary embodiment of the systems and method of this invention have been described in conjunction with a specific exemplary embodiment thereof, it is evident that many alternatives, modifications and variations will be apparent to those skilled in the art. Accordingly, the exemplary embodiments of the invention set forth above are intended to be illustrative, not limiting. Therefore, various changes may be made without departing from the spirit and scope of the invention.

Further, it is advantageous to provide electronic registration of the image separation layers using tagged, antialiased bytemaps. The use of antialiased data directly leads to using a hyperacuity printer such as that disclosed in commonly assigned U.S. Pat. No. 5,696,604, which is hereby incorporated by reference in its entirety, to print the data, because hyperacuity printers are especially well-suited for printing the color image separation layers of halftoned images. This is because hyperacuity printing effectively controls the positioning of the contrast transitions, i.e., the edges, within the respective color image separation layers to a sub-pixel precision.

Hyperacuity printing is performed by rendering halftone dots using different shapes. The antialiased data also allows mapping of images into the scan pitch of the image forming apparatus and decouples the resulting resolution from the scan pitch of the image forming apparatus.

Further, using the systems and methods of this invention in conjunction with the methods and systems for hyperacuity printing described in U.S. Pat. Nos. 5,138,339, 5,410,414, 5,638,107 and 5,638,110, and U.S. application Ser. No. 09/084,988, each incorporated herein by reference in its entirety, provides the ability to adjust locations of rendered edges with improved accuracy.

When the two-dimensional slope thresholding in a hyperacuity printer described in incorporated '110 patent is used in conjunction with the systems and methods of this invention, the input/digital front end resolution need not correspond to the resolution of the output/image forming apparatus in a strict one-to-one relationship. However, this invention may be used in conjunction with traditional halftoning methods using "threshold arrays".

Finally, it should be understood that, although the exemplary embodiments of the systems and method of this invention have been explained above using various exemplary structures that use lasers to produce printed images, the systems and methods according to this invention may also be used in conjunction with ink jet printers and any other known or later developed image forming apparatus. Therefore, rather than utilizing laser modulation to effect the size of an exposure spot, ink quantity control when producing a halftone region would necessarily use different set points in comparison to ink quantity used when producing text and/or lineart.

APPENDIX

© XEROX, 1999 hexdot4.mcd    DNCurry    1/6/96    making a hexagional halftone dot structure .

| | | | |
|---|---|---|---|
| v = 54.075 intensity | dp = 600 scans per inch | mdls = 32 modulus |
| a = 30.5 accum, a dir | mltpy = 4 addressability units per resample | sFrq = 106.066 screen frequency |
| b = 4.5 accum, b dir | α = 16 number of levels | sAng = -45 screen angle |
| c = 1.5 memory ofst | to = 63.5418635178 | fb = -0.05 fast bias |
| | htLev = 128 | |

$$cInc = \frac{c - \frac{mltpy - 1}{2}}{mltpy} \quad \text{range of 1} \quad cInc = 0$$

xFrq = sFrq       yFrq = sFrq
amod = mdls      bmod = mdls $$mOvr2 = \frac{mdls}{2} \quad mOvr2 = 16$$

$$fastInc = xFrq \cdot \frac{mdls}{dp} \qquad slowInc = yFrq \cdot \frac{mdls}{dp}$$

fastInc = 5.657     slowInc = 5.657

$$150 \cdot \frac{\sqrt{3}}{2} = 129.90381$$

cos15 = cos(15·deg)    sin15 = sin(15·deg)

$$pTms(a,b) = \frac{\sqrt{2}}{\sqrt{3}} \cdot (a \cdot \cos 15 + b \cdot \sin 15) \qquad aTms(p,q) = \sqrt{2} \cdot (p \cdot \cos 15 - q \cdot \sin 15) \qquad mxayi(x,y,z) = y + z \cdot (y - x)$$

$$qTms(a,b) = \frac{\sqrt{2}}{\sqrt{3}} \cdot (a \cdot \sin 15 + b \cdot \cos 15) \qquad bTms(p,q) = \sqrt{2} \cdot (q \cdot \cos 15 - p \cdot \sin 15)$$

calculate the halftone a and b increments in theta1 direction.

aInc = mod(fastInc·if(| cos(sAng·deg) |<.0001,0,cos(sAng·deg)),amod)     aInc = 4      a cmpnt fast inc
bInc = mod(fastInc·if(| sin(sAng·deg) |<.0001,0,sin(sAng·deg)),bmod)     bInc = -4     b cmpnt fast inc
aStp = mod(slowInc·if(| cos((sAng - 90)·deg) |<.0001,0,cos((sAng - 90)·deg)),amod)     aStp = -4    a cmpnt slow inc
bStp = mod(slowInc·if(| sin((sAng - 90)·deg) |<.0001,0,sin((sAng - 90)·deg)),bmod)     bStp = -4    b cmpnt slow inc transform from rhombus space into halftone space inc and stp.
aInc1 = aTms(aInc,bInc)    aInc1 = 6.928      aStp1 = aTms(aStp,bStp)    aStp1 = -4
bInc1 = bTms(aInc,bInc)    bInc1 = -6.928     bStp1 = bTms(aStp,bStp)    bStp1 = -4

Find coordinates with c offset.
a1 = a + cInc·aInc1        a1 = 30.5
b1 = b + cInc·bInc1        b1 = 4.5

******************* obtain the radius r as a function of v. *******************
Let the density range from 0 to .5 and back to 0 as v ranges from 0 to htLev.

$$dnsty(v) = if\left[(v - to) < 0, \frac{v}{2 \cdot to}, .5 - \frac{v - to}{2 \cdot (htLev - 1 - to)}\right]$$

vl = 0 .. htLev $$aRhmb = \frac{mdls^2}{\sqrt{3}} \qquad rmax = \frac{\sqrt{2}}{6} \cdot mdls \qquad mOrt6 = \frac{mdls}{\sqrt{6}}$$

area coverage should range from 0 to half the area of the rhombus and back:
dnsty of .5 corresponds to aRhomb/2; dnsty of one corresponds to aRhomb
    areaCov = dnsty·aRhmb
the area covered is the area of the circle:
find density cuttoff where circle radius equals rmax:

$$dCut = \frac{\pi \cdot rmax^2}{aRhmb} \qquad dCut = 0.302$$

case 1: dnsty ranges from 0 to dCut as circle expands to rmax.
    area covered is area of circle:

$$dnsty \cdot aRhmb = \pi \cdot r^2 \qquad r1(dnsty) = \sqrt{\frac{aRhmb}{\pi} \cdot dnsty}$$

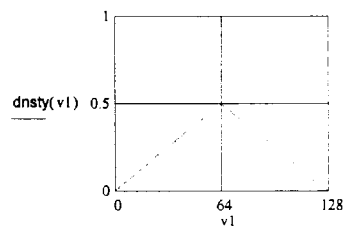

APPENDIX
© Xerox, 1999 case 2: dnsty ranges from dCut to .5 as trapizoid expands to fill right triangle and circle contracts back to 0.
area covered is area of circle plus six times the area of the trapizoid $$dnsty \cdot aRhmb = \pi \cdot r^2 + 6 \cdot \left(\frac{rmax - r}{2} + r\right) \cdot \left(mOrt6 - r \cdot \sqrt{3}\right)$$

$$r2(d) = \frac{-3 \cdot rmax \cdot \sqrt{3} + 3 \cdot mOrt6 + \sqrt{27 \cdot rmax^2 + 18 \cdot rmax \cdot \sqrt{3} \cdot mOrt6 + 9 \cdot mOrt6^2 + 4 \cdot \pi \cdot d \cdot aRhmb - 12 \cdot \pi \cdot mOrt6 \cdot rmax - 12 \cdot \sqrt{3} \cdot d \cdot aRhmb}}{2 \cdot (-\pi + 3 \cdot \sqrt{3})}$$

set up equation for r as a function of v:
  r(d) := if(d≤dCut,r1(d),r2(d))
  r := r(dnsty(v))     r = 4.63    r := if(r<.0001,.0001,r)

find the center of the circle in equation space:

xo := if[dnsty(v)<dCut, 0, √3·(rmax - r)]    xo = 5.045
  yo := if(dnsty(v)<dCut, 0, rmax - r)         yo = 2.913 check:
  r1(dCut) = 7.542        $mO2rt3 := \frac{mdls}{2 \cdot \sqrt{3}}$
  r2(dCut) = 7.542
  rmax = 7.542            mO2rt3 = 9.238

**************** Get dist, angle as a function of a, b, and r **************** define constant:

$mOvr6 := \frac{mdls}{6}$     mOvr6 = 5.333

***************** find the spot in equation space *******************
modulo the position
  a2 := mod(a1 + amod, amod)        a2 = 30.5
  b2 := mod(b1 + bmod, bmod)        b2 = 4.5 scale the halftone space (a,b) into the rhombus space (p, q).
  p1 := pTrns(a2,b2)                p1 = 25.006
  q1 := qTrns(a2,b2)                q1 = 9.994

If position is in upper right half of rhombus, rotate to lower left half:
  rmbUpr := if(p1 + q1>amod, 1, -1)    rmbUpr = 1
  p2 := mxayi(p1,mOvr2,rmbUpr)         p2 = 6.994
  q2 := mxayi(q1,mOvr2,rmbUpr)         q2 = 22.006

The following is for graphing purposes:
  rA := mOvr2 - mO2rt3
  rB := mOvr2 + mO2rt3
  y1(x) := -x + amod
  y2(x,b,c) := tan(15·deg)·(x - c) + b
  y3(x,b,c) := tan(75·deg)·(x - c) + b
  x1 := 0, amod .. amod
  x2 := 0, rB .. rB
  x3 := rA, amod .. amod
  x4 := 0, rA .. rA
  x5 := rB, amod .. amod green = position in halftone space
red   = position in rhombus space

APPENDIX
© XEROX, 1999 translate so center of equilateral triangle is at origin:
  p3 := p2 - 2·mOvr6        p3 = -3.672
  q3 := q2 - 2·mOvr6        q3 = 11.339 measure the angle from the position to new origin plus 15 degrees:

$$\text{sctrLoc} := \text{mod}\left(\frac{\text{angle}(p3,q3)}{\text{deg}} + 15, 360\right)$$      sctrLoc = 122.945 rotate the sectors so they coincide with vertical:
  sctrRot := if(sctrLoc≥240,-195,if(sctrLoc≥120,-75,-315))   sctrRot = -75
  sinSctr := sin(sctrRot·deg)   cosSctr := cos(sctrRot·deg)
  p4 := p3·cosSctr - q3·sinSctr        p4 = 10.002
  q4 := p3·sinSctr + q3·cosSctr        q4 = 6.482 if spot is in left half of full sector, mirror over to right half:
  sctrFold := if(p4<0,1,-1)            sctrFold = -1
  ps := mxayi(p4,0,sctrFold)           ps = 10.002
  qs := q4                             qs = 6.482

******************* find the edge *******************
mirror the spot horiz. over r-max if the edge is outside rhombus.
  highLightDot := if(v<to,1,-1)   v = 54.075   to = 63.542    highLightDot = 1
  otsdRmb := highLightDot·rmbUpr                              otsdRmb = 1
  ps1 := ps                                                   ps1 = 10.002    otsdRmb = 1
  qs1 := mxayi(qs,rmax,otsdRmb)                               qs1 = 8.603 find the undirected angle of the edge from the spot position:

$$\theta E1 := \text{if}\left(ps1 \leq xo, 90, \frac{\text{angle}(ps1 - xo, qs1 - yo)}{\text{deg}}\right)$$      θE1 = 48.94 find the position of the edge using this angle
  pe1 := if(ps1≤xo,ps,xo + r·cos(θE1·deg))    pe1 = 8.086
  qe1 := if(ps1≤xo,rmax,yo + r·sin(θE1·deg))  qe1 = 6.404 mirror this angle around 0 if the edge is outside the rhombus
  θE2 := mxayi(θE1,0,otsdRmb)          θE2 = -48.94 mirror the edge horiz around r-max if the edge is outside rhombus:
  pe := pe1                            pe = 8.086
  qe := mxayi(qe1,rmax,otsdRmb)        qe = 8.681 rmax = 7.542
dnsty(v) = 0.426
r = 4.63
xo = 5.045
yo = 2.913 the following is for graphing purposes only:

$$\text{oneOvrRt3} := \frac{1}{\sqrt{3}} \qquad \text{oneOvrRt3} = 0.577$$

y6(x) := x·oneOvrRt3 y7(x) := mOvr6·$\sqrt{2}$ x6 := 0 .. mOvr6·$\sqrt{2}$·$\sqrt{3}$ $$x8 := xo, xo + \frac{r \cdot \cos(30 \cdot \text{deg})}{40} \ .. \ xo + r \cdot \cos(30 \cdot \text{deg})$$

y8(x) := $\sqrt{r^2 - (x - xo)^2}$ + yo y9 := yo, mOvr6·$\sqrt{2}$ .. mOvr6·$\sqrt{2}$ green: spot; red: edge check θE2 should agree with angle derrived from position $$\frac{\text{angle}(pe - ps, qe - qs)}{\text{deg}} = 131.06$$

htLev = 128
highLightDot = 1
rmbUpr = 1
sctrFold = -1
sctrRot = -75

27                                           APPENDIX
                                             © XEROX, 1999

Get the distance and angle from the spot to the edge, compensating for equ. space, and wether the region is black or white.
Determine if this a black or white region:
                                             unmirror left half of full sector from right half:
position of edge:  position of spot:  angle to edge:
                                                pe2 = mxayi(pe,0,sctrFold)           pe2 = 8.086
   pe = 8.086        ps = 10.002      θE2 = -48.94
                                                qe2 = qe                             qe2 = 8.681
   qe = 8.681        qs = 6.482
                                             unrotate the sectors from vertical back to the equalateral trianglel:
   distToEdge = $\sqrt{pe1^2 + qe1^2}$   distToSpot = $\sqrt{ps1^2 + qs1^2}$
                                                pe3 = qe2·sinSctr + pe2·cosSctr      pe3 = -6.293
   distToEdge = 10.315   distToSpot = 13.193
                                                qe3 = qe2·cosSctr - pe2·sinSctr      qe3 = 10.057 edgeFarther = if(distToEdge>distToSpot,1,-1)
                                             untranslate so lower left corner of equallateral triangle is at origin:
                                                pe4 = pe3 + 2·mOvr6                  pe4 = 4.374    p2 = 6.994
   blkRegion = edgeFarther·highLightDot
                                                qe4 = qe3 + 2·mOvr6                  qe4 = 20.724   q2 = 22.006
   edgeFarther = -1    blkRegion = -1

Find the b/w distance from the spot position to the edge.
                                             If position was in upper right half, unrotate from lower left half:
                                                pe5 = mxayi(pe4,mOvr2,rmbUpr)        pe5 = 27.626   p1 = 25.006
   dist = $\sqrt{(pe - ps)^2 + (qe - qs)^2}$·blkRegion   dist = -2.917
                                                qe5 = mxayi(qe4,mOvr2,rmbUpr)        qe5 = 11.276   q1 = 9.994
make angle to edge directed:            θE2 = -48.94
   θE3 = θE2 - mxayi(180,90,edgeFarther)   θE3 = -228.94

Find the angle to the edge in halftone cell space:
   θE4 = mod(mxayi(θE3,90,sctrFold) - sctrRot + mxayi(0,90,rmbUpr) + 540,360) - 180     θE4 = 26.06 green: spot; red: edge; in rhombus space

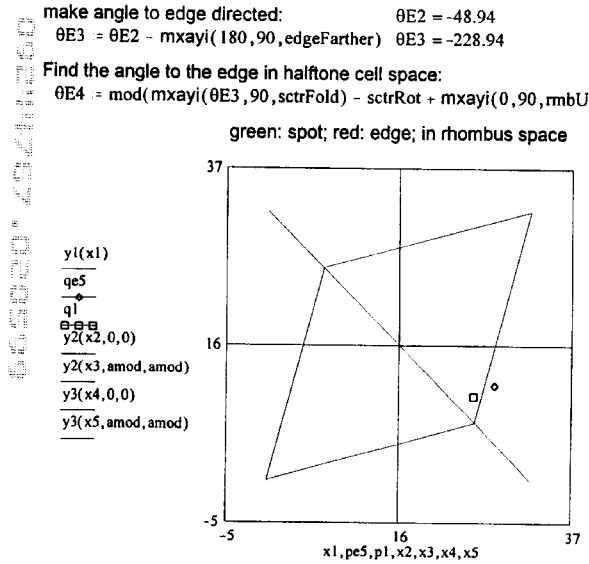

check:
$\dfrac{\text{angle}(pe5 - p1, qe5 - q1)}{\deg} = 26.06$ sctrFold = -1
sctrRot = -75
rmbUpr = 1 unscale into halftone space (a,b) from the rhombus space (p, q).
   ae6 = aTrns(pe5,qe5)        ae6 = 33.611    a2 = 30.5
   be6 = bTrns(pe5,qe5)        be6 = 5.291     b2 = 4.5 a=30.5              htLev = 128
   b=4.5               highLightDot = 1
   c=1.5               rmbUpr = 1
   v=54.07531          sctrFold = -1
                       sctrRot = -75

**************** get mdf for scan freq and angle ****************
add scan angle, modulo 360, centered around zero degrees.
   sAng = -45
   θE = mod(θE4 + 540 - sAng,360) - 180         θE = 71.06

Find the fast x and slow y components of the angle.
   x1 = cos(θE·deg)   x1Squ = $x1^2$        x1 = 0.325    x1Squ = 0.105
   y1 = sin(θE·deg)   y1Squ = $y1^2$        y1 = 0.946    y1Squ = 0.895

$\dfrac{dist1 - fb·|\cos(\theta E \cdot \deg)|}{\sin(\theta E \cdot \deg)^2} + .5$ Add the mdf, modulation drive function, to get gray out for dac.
   inc = if(fastInc=slowInc,fastInc,fastInc·x1Squ + slowInc·y1Squ)   inc = 5.657
   dist1 = $\dfrac{dist}{inc}$   From memLocs to scans               dist1 = -0.516 gray1 = $\dfrac{dist1 - fb·|x1|}{y1Squ} + .5$ gray1 = -0.058
   gray2 = if(gray1<0,0,if(gray1≥.9999,.9999,gray1))                  gray2 = 0
   gray = floor(gray2·(α - 1))                                        gray = 0

What is claimed is:

1. An image rendering system that renders images based on image data indicative of an image to be rendered, the image rendering system comprising:

an interpolator that warps the image data; and a halftoner that implements halftone screens including a hexagonal dot screen and at least one tilted line screen, wherein the halftoner one-dimensionally warps the at least one tilted line screen to conform with the hexagonal dot screen as a tone-variation-resistant halftone screen system.

2. The image rendering system of claim 1, wherein the halftoner warps the at least one tilted line screen to conform with the hexagonal dot screen so that the warped of the at least one tilted line screen corresponds to the image data warp performed by the interpolator.

3. The image rendering system of claim 1, wherein the halftoner includes a screen generator that implements the hexagonal dot screen and the at least one tilted line screen.

4. The image rendering system of claim 3, wherein the screen generator also implements a non-tilted line screen and a second tilted line screen, the tone-variation-resistant halftone screen system including both tilted line screens, the non-tilted line screen and the hexagonal grid screen positioned to conform with each other to form a hexagonal grid structure.

5. The image rendering system of claim 4, wherein the hexagonal dot screen produces a luminance image separation layer and the tilted line screens and the non-tilted line screen produce chrominance image separation layers.

6. The image rendering system of claim 5, further comprising an image forming apparatus for rendering the image, wherein the hexagonal dot screen is electronically registered with a grid structure of the image forming apparatus.

7. The image rendering system of claim 1 further comprising an image forming apparatus for rendering the image, wherein the hexagonal dot screen is electronically registered with a grid structure of the image forming apparatus.

8. The image rendering system of claim 1, further comprising an image data generator that generates the image data indicative of the image to be rendered.

9. The image rendering system of claim 1, wherein the hexagonal dot screen produces a luminance image separation layer and the tilted line screen produces a chrominance image separation layer.

10. The image rendering system of claim 1, wherein the image data is tagged, antialiased bytemaps.

11. A tone-variation-resistant halftone screen system that is tone-variation resistant, the system comprising:

a hexagonal dot screen;

at least one tilted line screen;

wherein the at least one tilted line screen is one-dimensionally warped to be positioned collateral with the hexagonal dot screen.

12. The halftone screen system of claim 11, further comprising a second tilted line screen and a non-tilted line screen, wherein the tilted and non-tilted line screens correspond to chrominance image separation layers and the hexagonal dot screen corresponds to a luminance image separation layer.

13. The halftone screen system of claim 11, wherein the chrominance image separation layers are cyan, magenta and yellow and the luminance image separation layer is black.

14. The halftone screen system of claim 11, wherein the luminance image separation layer is electronically registered with and printed to be coincident with an output grid structure of an image forming apparatus.

15. A method for rendering images, the method comprising:

rendering a luminance image separation layer, based on image data, coincident with a grid structure of an image forming apparatus using a hexagonal dot screen;

one-dimensionally warping each of the at least one tilted line screens to chrominance image separation layers to conform to the luminance image separation layer rendered using the hexagonal dot screen; and rendering at least one chrominance image separation layer, based on image data, using one of that at least one tilted line screen and a non-tilted line screen.

16. The method of claim 15, further comprising warping the image data using a resampling interpolator prior to the warping and rendering steps.

17. The method of claim 16, wherein one-dimensionally warping each of the at least one tilted line screens produces chrominance image separation layers that are warped to correspond with the warping of the image data performed by the interpolator.

18. The method of claim 15, further comprising adjusting a position of a rendered halftone dot in a slow-scan direction by one-dimensionally warping the tilted line screen in the fast-scan direction.

19. The method of claim 15, wherein the image data is tagged, antialiased bytemaps.

20. The method of claim 15, wherein the chrominance image separation layers rendered using the at least one tilted line screens are one of magenta and cyan and the chrominance image separation layer rendered using the non-tilted line screen is yellow.

21. The method of claim 20, further comprising injecting pseudo random noise into image data used to render the yellow image separation layer with the non-tilted line screen.

* * * * *